(12) United States Patent
Misawa (10) Patent No.: US 12,330,161 B2
(45) Date of Patent: Jun. 17, 2025

(54) MIXING SYSTEM AND MEASUREMENT SYSTEM

(71) Applicant: Hitachi, Ltd., Tokyo (JP)

(72) Inventor: Tomonari Misawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 814 days.

(21) Appl. No.: 17/473,071

(22) Filed: Sep. 13, 2021

(65) Prior Publication Data

US 2022/0088607 A1 Mar. 24, 2022

(30) Foreign Application Priority Data

Sep. 23, 2020 (JP) ................................ 2020-158768

(51) Int. Cl.
*B01L 3/00* (2006.01)

(52) U.S. Cl.
CPC ............... *B01L 3/523* (2013.01); *B01L 3/565* (2013.01); *B01L 2200/0689* (2013.01);
(Continued)

(58) Field of Classification Search
CPC .. B01L 3/523; B01L 3/565; B01L 2200/0689; B01L 2200/08; B01L 2200/10; B01L 2200/141; B01L 2300/049; B01L 2300/0627; B01L 2300/0681; G01N 2001/205; G01N 35/1095; G01N 2035/00534; G01N 2035/1032; G01N 1/2035; G01N 1/38; G01N 35/1011; B01F 35/13; B01F 35/712; B01F 35/7179; B01F 23/49

See application file for complete search history.

(56) References Cited

U.S. PATENT DOCUMENTS

| | | | | |
|---|---|---|---|---|
| 5,340,467 A | * | 8/1994 | Gregoli | B01F 25/43151 |
| | | | | 252/61 |
| 5,753,830 A | * | 5/1998 | Sundh | G01N 1/10 |
| | | | | 73/864.81 |

(Continued)

FOREIGN PATENT DOCUMENTS

| | | |
|---|---|---|
| CN | 108387434 A | 8/2018 |
| JP | 2002-505421 A | 2/2002 |

(Continued)

OTHER PUBLICATIONS

Extended European Search Report issued in European Application No. 21192487.3 dated Feb. 11, 2022 (nine (9) pages).

(Continued)

*Primary Examiner* — Jill A Warden
*Assistant Examiner* — Alex Ramirez
(74) *Attorney, Agent, or Firm* — Crowell & Moring LLP (57) ABSTRACT

Provided are a compact mixing system capable of reducing a use amount of a mixing agent and reducing a volume of a utility that supplies the mixing agent, and a measurement system using the mixing system. The mixing system includes: a mixing agent discharge nozzle through which a mixing agent to be mixed with a sample is to be discharged; and a movable mechanism configured to adjust a gap between the mixing agent discharge nozzle and a sample collection port that opens to an inside of a sample tube through which the sample is to flow so as to collect the sample.

10 Claims, 7 Drawing Sheets

(52) U.S. Cl.
CPC ....... *B01L 2200/08* (2013.01); *B01L 2200/10* (2013.01); *B01L 2200/141* (2013.01); *B01L 2300/049* (2013.01); *B01L 2300/0627* (2013.01); *B01L 2300/0681* (2013.01)

(56) References Cited

U.S. PATENT DOCUMENTS

| | | | |
|---|---|---|---|
| 6,007,235 A | * | 12/1999 | Freud .................. G01N 1/2035 366/136 |
| 2014/0250987 A1 | | 9/2014 | Canty et al. |
| 2015/0096358 A1 | * | 4/2015 | Putnam .................. B01L 3/505 73/64.56 |
| 2016/0208470 A1 | * | 7/2016 | Franke ...................... E03C 1/23 |

FOREIGN PATENT DOCUMENTS

| WO | WO 95/23327 A1 | 8/1995 |
|---|---|---|
| WO | WO 99/44033 A2 | 9/1999 |

OTHER PUBLICATIONS

Chinese-language Office Action issued in Chinese Application No. 2021108952506 dated Sep. 5, 2023 (9 pages).

\* cited by examiner

MIXING SYSTEM AND MEASUREMENT SYSTEM

BACKGROUND OF THE INVENTION

1. Field of the Invention

The present invention relates to a mixing system and a measurement system.

2. Description of the Related Art

In related art, a system that extracts a processed medium sample and dilutes the extracted sample has been known. JP-A-2002-505421 discloses a sampling and dilution system that extracts and prepares a processed medium for analysis in a particle size distribution measuring device.

JP-A-2002-505421 discloses a system that extracts a representative sample of a processed medium flowing in a processing flow under a first pressure, and supplies the extracted representative sample to a mixing chamber together with a diluent medium. The system connects the mixing chamber to a source of a second pressure which has a value lower than the first pressure of the processing flow. An extraction flow control device connects the mixing chamber to the processing flow and is operable in a first position or alternatively a second position. When the extraction flow control device is operated in the first position, the second pressure of the mixing chamber is connected to the first pressure of the processing flow, and in response to a pressure difference, a part of the processed medium is drawn from the processing flow through the extraction flow control device. Furthermore, a source of diluent medium under a third pressure is connected to and included in the extraction flow control device. The third pressure also has a value greater than the second pressure. By operating the extraction flow control device in the second position, the first pressure of the processing flow is isolated from the second pressure and the second pressure is connected to the third pressure of the source of diluent medium. In response to a pressure difference between the third pressure and the second pressure, the diluent medium flows from the source of diluent medium through the extraction flow control device to the mixing chamber while carrying the representative sample of the processed medium previously extracted.

When measurement is performed in real time by using the configuration as in JP-A-2002-505421, it is necessary to replace a processing medium in a tube from a probe to a measuring device and a chamber, and to dilute a concentration of the processing medium to dilute the concentration to a concentration suitable for measurement at each measurement timing.

However, a collected sample remains between the probe and the extraction flow control device. Then, when continuous measurement is to be performed, a large amount of a diluent is required depending on the concentration of the processing medium due to occurrence of remaining, and a large-scale diluent supply utility is required.

Therefore, an object of the invention is to provide a compact mixing system capable of reducing a use amount of a mixing agent and reducing a volume of a utility that supplies the mixing agent, and a measurement system using the mixing system.

SUMMARY OF THE INVENTION

According to a first aspect of the invention, there is provided a mixing system including: a mixing agent discharge nozzle through which a mixing agent to be mixed with a sample is to be discharged; and a movable mechanism configured to adjust a gap between the mixing agent discharge nozzle and a sample collection port that opens to an inside of a sample tube through which the sample is to flow so as to collect the sample.

According to a second aspect of the invention, there is provided a measurement system including the mixing system and a measurement unit configured to measure the sample collected by the mixing system.

Advantageous Effect

According to the invention, it is possible to provide a compact mixing system capable of reducing a use amount of a mixing agent and reducing a volume of a utility that supplies the mixing agent, and a measurement system using the mixing system.

DESCRIPTION OF THE PREFERRED EMBODIMENTS

Figure 1:
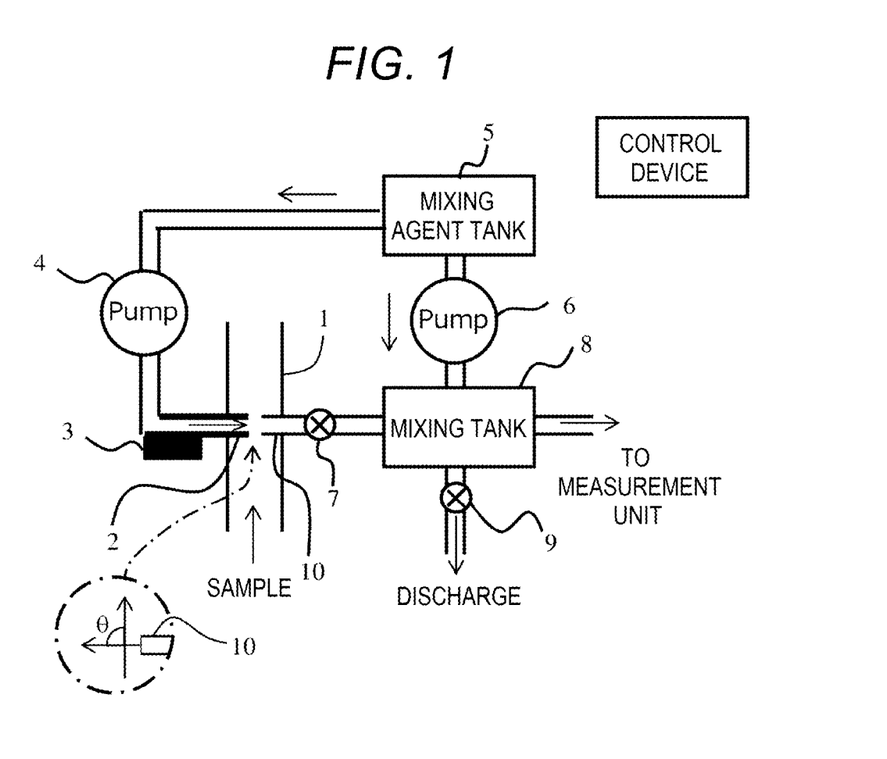
FIG. 1 is a schematic diagram showing a configuration of a mixing system according to a first embodiment of the invention.

Hereinafter, a first embodiment of the invention will be described with reference to drawings. FIG. 1 is a schematic diagram showing a configuration of a mixing system according to the present embodiment.

As shown in FIG. 1, the mixing system includes a sample tube 1, a mixing agent discharge nozzle 2, an actuator 3, liquid feeding pumps (4, 6), a mixing agent tank 5, valves (7, 9), a mixing tank 8, and a sample collection nozzle 10.

The sample tube 1 is a tube through which a sample to be measured flows, and the mixing agent discharge nozzle 2 and the sample collection nozzle 10 are connected to the sample tube 1.

The sample collection nozzle 10 is connected to the mixing tank 8 via the valve 7. The sample collection nozzle 10 is formed with a sample collection port that collects the sample flowing through the sample tube 1.

The mixing agent discharge nozzle 2 is connected to the mixing agent tank 5 via the pump 4, and the mixing agent discharge nozzle 2 is formed with a discharge port through which a mixing agent is discharged. In addition, the mixing agent discharge nozzle 2 is capable of changing a distance from the sample collection nozzle 10 by driving the actuator 3. The actuator 3 moves the mixing agent discharge nozzle 2, and constitutes a movable mechanism that adjusts a gap between the sample collection port and the mixing agent discharge nozzle 2.

The sample collection port of the sample collection nozzle 10 and the discharge port of the mixing agent discharge nozzle 2 open to an inside of the sample tube 1. When the actuator 3 is driven and the mixing agent discharge nozzle 2 is brought close to the sample collection nozzle 10, the ports are connected in close contact with each other such that the mixing agent is sent from the mixing agent discharge nozzle 2 to the sample collection nozzle 10.

A seal member made of rubber or the like is provided at the discharge port of the mixing agent discharge nozzle 2 so that the sample does not enter an inside of the nozzle in a state where the ports are connected. The seal member constitutes a sealing mechanism that prevents the sample from entering at least one of the mixing agent discharge nozzle 2 and the sample collection port in the state where the ports are connected. Then, entering of the sample is prevented and an accuracy of sample collection is improved by sealing the port of the nozzle (that is, it is possible to prevent the collection in excess of a target collection amount).

In addition, in order to move the mixing agent discharge nozzle 2 such that the sample in the sample tube 1 does not leak to an outside, the sample tube 1 and the mixing agent discharge nozzle 2 are connected via an O-ring or a diaphragm.

It is desirable that the sample collection port of the sample collection nozzle 10 opens so as not to be shadowed with respect to a flow direction of the sample in the sample tube 1 (in other words, it is desirable that no obstacles overlapped with the sample collection port exist when viewed from an upstream direction of a flow of the sample). If the sample collection port opens so as to be shadowed with respect to the flow direction of the sample, the sample may not enter the sample collection port. In addition, when the sample is a slurry having a particle size distribution, the particle size distribution of the sample before and after collection may change due to a change in collection efficiency depending on a particle size.

From such an aspect, it is desirable that a direction of the sample collection port is at 90° or more with respect to the flow direction of the sample, and no obstacles overlapped with the sample collection port exist when viewed from the upstream direction of the flow of the sample. As a result, it is possible to accurately collect the sample from the sample collection port. In FIG. 1, an example of the direction of the sample collection port is shown by an angle θ. In addition, it is desirable that the sample collection port opens in the vicinity of a center of the tube at which the flow of the sample is faster than that at an inner wall side of the tube.

The mixing tank 8 is connected to the sample collection nozzle 10 via the valve 7, and the sample and the mixing agent are sent from the sample collection nozzle 10 to the mixing tank 8. Furthermore, the mixing tank 8 is connected to the mixing agent tank 5 via the liquid feeding pump 6, and the mixing agent is directly sent from the mixing agent tank 5. The valve 7 constitutes a shutoff mechanism that is capable of shutting off the flow of the sample flowing in from the sample collection port in a closed state.

In the mixing tank 8, the sample and the mixing agent are mixed by a stirring device, and a mixed liquid used for measurement is prepared. The stirring device may be, for example, a device that performs stirring with a stirring blade or a device that performs stirring with ultrasonic waves, as long as it can appropriately perform mixing. The mixed liquid used for the measurement is sent to a measurement unit that measures the sample. When the sample in the mixing tank 8 is to be replaced, the valve 9 is opened, and the mixed liquid is discharged to the outside of the system.

Components such as the actuator 3 that moves the nozzle, the liquid feeding pumps (4, 6), the valves (7, 9), and the stirring device in the mixing tank 8 operate based on an input electric signal. The mixing system may be a system including a control device that causes the components to operate. In this case, the control device includes an arithmetic processing unit and a storage device (ROM), and the storage device stores a program necessary for causing the components to appropriately operate.

As shown in FIG. 1, the control device may be provided as a part of the mixing system. However, the control device may also be provided as a device separate from the mixing system. The control device may be a computer in which the program for causing the components to appropriately operate is stored, and may be, for example, a notebook personal computer. In this case, a user can establish an environment in which signals can be exchanged by connecting the components with the computer, and can appropriately operate the mixing system.

Figure 2:
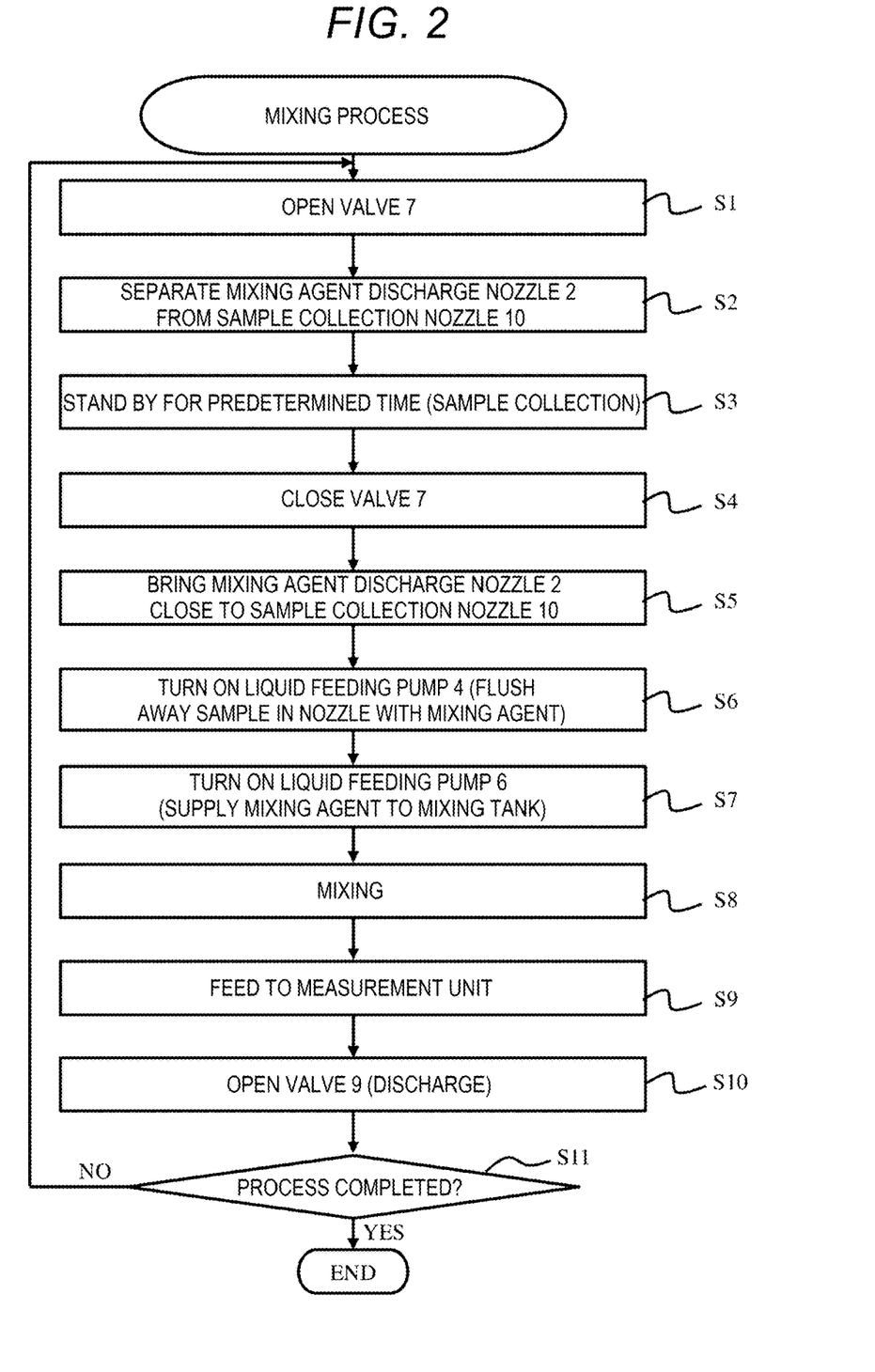
FIG. 2 is a mixing flowchart according to the first embodiment of the invention.

Next, an example of a mixing flow according to the present embodiment will be described with reference to FIG. 2.

First, the control device opens the valve 7 (S1), drives the actuator 3 to separate the mixing agent discharge nozzle 2 from the sample collection nozzle 10, and starts the sample collection (S2). A required amount of the sample is collected by standing by for a predetermined time in this state (S3). A collection amount of the sample is adjusted by a stand by time.

Next, the control device closes the valve 7 (S4), and brings the mixing agent discharge nozzle 2 close to the sample collection nozzle 10 to connect the ports (S5). In step (S5), the valve 7 is closed to shut off the flow of the sample. Therefore, the sample does not flow into the mixing tank 8 during movement of the mixing agent discharge nozzle 2, so the sample is prevented from flowing into the mixing tank 8 during the movement of the mixing agent discharge nozzle 2.

The control device opens the valve 7, turns on the liquid feeding pump 4 to discharge the mixing agent from the mixing agent discharge nozzle 2, and to push out the sample in the sample collection nozzle 10 (S6). Furthermore, the control device turns on the liquid feeding pump 6 to supply the mixing agent to the mixing tank 8 so as to adjust a sample concentration in the mixing tank 8 to a predetermined value (S7). Next, the control device causes the stirring device to perform mixing so that the concentration in the mixing tank becomes uniform (S8), and the mixed liquid used for the measurement is sent to the measurement unit (S9).

The control device opens the valve 9 to discharge the unwanted mixed liquid (S10). When a change of the sample in the sample tube 1 is to be measured in real time, the control device repeats the processes of (S1) to (S10) (S11).

When the sample remains in a nozzle, a tube, or the like at the time of collecting the sample, an amount of the sample sent to a tank in which the sample and the mixing agent is mixed is always larger than an amount of the remaining sample. Therefore, when the sample remains, it can be said that the amount of the remaining sample is a lower limit amount of the collection amount.

Therefore, when the sample and the mixing agent are mixed using a system in related art, the collection amount is larger than an amount of the sample to be collected by the amount of the remaining sample, and as a result, an extra diluent having an amount corresponding to that of the remaining sample is required. Further, in a situation where the sample and the mixing agent are mixed in real time, the amount of the required diluent increases greatly depending on the number of times of mixing, and therefore it can be said that a utility that supplies the diluent also increases in scale accordingly.

However, in the present embodiment, since the sample in the sample collection nozzle 10 is flushed away with the mixing agent after sample collection, it can be said that the sample does not remain, and therefore a new sample can be sent to the mixing tank 8 alone at the time of next sample collection. Therefore, the collection amount of the sample can be reduced by eliminating the remaining, so a use amount of the mixing agent can be reduced. As a result, it is possible to provide a compact mixing system in which the use amount of the mixing agent is reduced and a volume of a supply utility is reduced.

In the present embodiment, the control device controls the actuator 3 so as to widen the gap between the sample collection port and the mixing agent discharge nozzle 2 when the sample is to be collected in step (S2). As a result, a space between the mixing agent discharge nozzle 2 and the sample collection port is widened, so the sample can easily enter the sample collection port, and the sample can be appropriately collected. On the other hand, the control device controls the actuator 3 so as to narrow the gap between the sample collection port and the mixing agent discharge nozzle 2 when the collection of the sample is completed in step (S5). As a result, the mixing agent discharged from the mixing agent discharge nozzle 2 can appropriately flow into the sample collection port.

In addition, in the present embodiment, an example has been described in which the liquid feeding pump 4 is turned on (S6) and then the liquid feeding pump 6 is turned on to supply the mixing agent to the mixing tank (S7), but supply of the mixing agent may be started from any timing (S1 to S5) after start of the mixing flow. The control device may cause the mixing agent discharge nozzle 2 to discharge the mixing agent, for example, at the timing of separating the mixing agent discharge nozzle 2 from the sample collection nozzle 10 (S2) or at the time of standing by for collecting the sample (S3), and as a result, it is possible to prevent the sample from entering the inside of the mixing agent discharge nozzle 2.

In the present embodiment, an example in which the actuator 3 is driven to move the mixing agent discharge nozzle 2 has been described. However, the sample collection nozzle 10 may also be moved by driving the actuator. In this case, the actuator constitutes a movable mechanism that moves the sample collection nozzle 10 and adjusts the gap between the sample collection port and the mixing agent discharge nozzle 2. Further, in this case, the control device can cause the actuator to operate in accordance with a program for causing the actuator to operate.

In the present embodiment, an example has been described in which the mixing agent discharge nozzle 2 and the sample collection nozzle 10 are connected in close contact with each other after the sample collection, but a spacing may be provided between the nozzles as long as the collection amount of the sample is not affected. In addition, one nozzle may also enter the other nozzle.

In the above description, it has been described that the seal member is provided at the discharge port of the mixing agent discharge nozzle 2. However, as long as the collection of the sample is not affected, the seal member may be provided at the sample collection port of the sample collection nozzle 10. In this case, the seal member constitutes a sealing mechanism that prevents the sample from entering the inside of the nozzle in the state where the ports are connected.

In the above description, an example has been described in which the control device causes the components to operate. However, as long as the mixing system can be appropriately operated, the user or the like may perform an operation in place of controlling by the control device to appropriately operate the mixing system. In this case, a component to be operated by the user or the like has a configuration that can be operated by the user or the like.

For example, the actuator 3 may be manually controllable (as an example, controllable between ON/OFF in a switch type), and the user or the like may operate the actuator 3 at an appropriate timing so that the user or the like may appropriately operate the mixing system.

Next, a second embodiment will be described with reference to drawings. In the present embodiment, an example will be described in which the accuracy of sample collection is improved as compared with the mixing system described in the first embodiment described above. The same reference numerals may be used in common among different drawings for the same parts as those in the above embodiment or parts having similar functions as those in the above embodiment, and duplicate description may be omitted.

Figure 3:
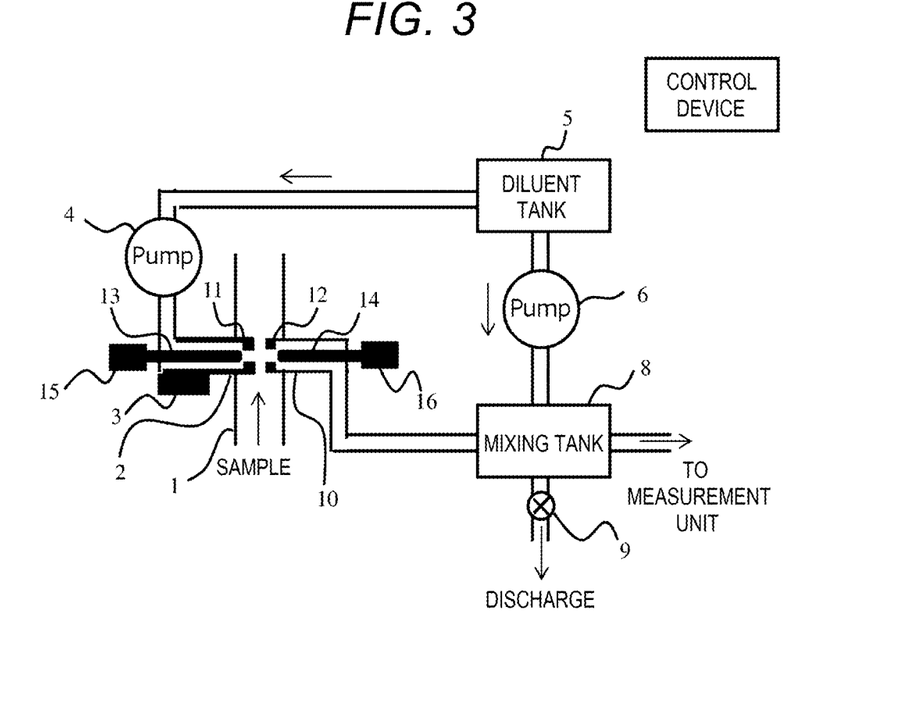
FIG. 3 is a schematic diagram showing a configuration of a mixing system according to a second embodiment of the invention.

FIG. 3 is a schematic diagram showing a configuration of a mixing system according to the present embodiment. As shown in FIG. 3, the mixing system includes the sample tube 1, the mixing agent discharge nozzle 2, actuators (3, 15, 16), the liquid feeding pumps (4, 6), the mixing agent tank 5, the valves (7, 9), the mixing tank 8, the sample collection nozzle 10, and pistons (13, 14).

In the present embodiment, an arrangement of the sample tube 1, the mixing agent discharge nozzle 2, the liquid feeding pumps (4, 6), the mixing agent tank 5, the mixing tank 8, and the sample collection nozzle 10 is the same as that of the first embodiment. However, a seal unit 11 and the piston 13 are added inside the mixing agent discharge nozzle 2, and a seal unit 12 and the piston 14 are added inside the sample collection nozzle 10. In addition, the actuator 15 that moves the piston 13 and the actuator 16 that moves the piston 14 are added.

Each piston (13, 14) can move back and forth along a central axis direction of the nozzle by driving the corresponding actuator (15, 16). In addition, a size of each seal unit (11, 12) is set such that a tip end portion of the piston (13, 14) extending in a forward direction abuts against the corresponding seal unit (11, 12) or moves to an inside of the corresponding seal unit (11, 12). An inner diameter of each seal unit (11, 12) is set to be smaller than an inner diameter of the corresponding nozzle (2, 10) and equal to or less than an outer diameter of the corresponding piston (13, 14).

According to the present embodiment, it is possible to prevent the sample flowing inside the sample tube 1 from entering the inside of the corresponding nozzle (2, 10) by causing the tip end portion of the piston (13, 14) to abut against the corresponding seal unit (11, 12) or to move to the inside of the corresponding seal unit (11, 12). Therefore, the seal unit 11 and the piston 13 constitute a sealing mechanism that prevents the sample from entering the mixing agent discharge nozzle 2. In addition, the seal unit 12 and the piston 14 constitute a sealing mechanism that prevents the sample from entering the sample collection nozzle 10.

Components such as the actuator 3 that moves the nozzle, the actuators (15, 16) that move the pistons, and the valves (7, 9) operate based on an input electric signal. The mixing system may be a system including a control device that causes the components to operate. In this case, the control device includes an arithmetic processing unit and a storage device (ROM), and the storage device stores a program necessary for causing the components to appropriately operate.

Figure 4:
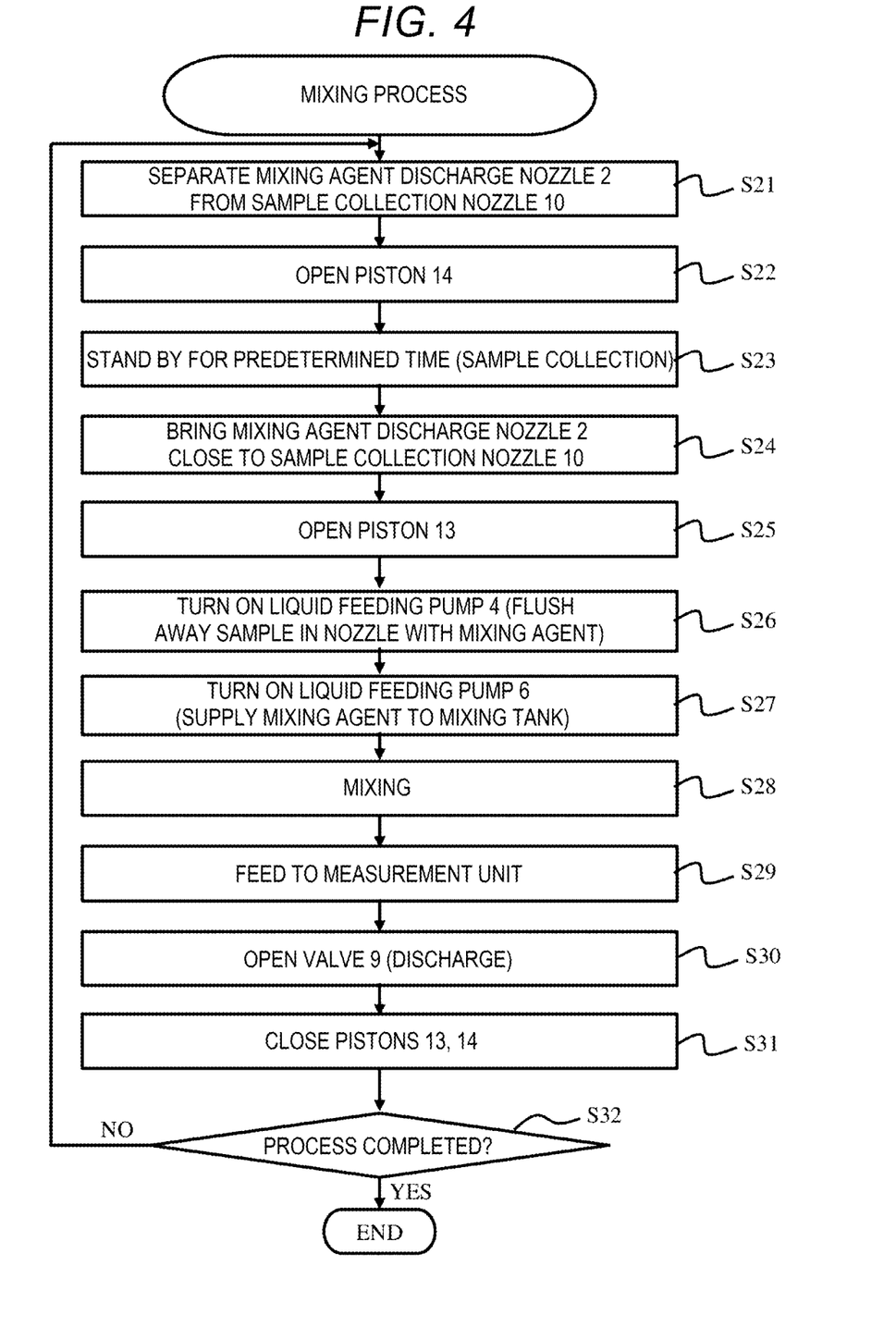
FIG. 4 is a mixing flowchart according to the second embodiment of the invention.

Next, an example of a mixing flow according to the present embodiment will be described with reference to FIG. 4.

First, the control device drives the actuator 3 to separate the mixing agent discharge nozzle 2 from the sample collection nozzle 10 (S21), and opens the piston 14 to start the sample collection (S22). A required amount of the sample is collected by standing by for a predetermined time in this state (S23). The collection amount of the sample is adjusted by a stand by time.

Next, the control device brings the mixing agent discharge nozzle 2 close to the sample collection nozzle 10 to connect the ports (S24).

The control device opens the piston 13 (S25), turns on the liquid feeding pump 4 to discharge the mixing agent from the mixing agent discharge nozzle 2, and to push out the sample in the sample collection nozzle 10 (S26). Furthermore, the control device turns on the liquid feeding pump 6 to supply the mixing agent to the mixing tank 8 so as to adjust the sample concentration in the mixing tank to a predetermined value (S27). Next, the control device controls the stirring device to perform mixing so that the concentration in the mixing tank becomes uniform (S28), and the mixed liquid is sent to the measurement unit (S29).

The control device opens the valve 9 to discharge the unwanted mixed liquid (S30). The control device closes the pistons (13, 14) to return the pistons to an initial state (S31). When the change of the sample in the sample tube 1 is to be measured in real time, the control device repeats the processes of S21 to S31 (S32).

According to the second embodiment described above, immediately after the mixing agent discharge nozzle 2 is separated from the sample collection nozzle 10 (S2), the sample in the sample tube 1 enters the inside of the mixing agent discharge nozzle 2 due to concentration diffusion, and therefore it is considered that the collection amount of the sample is larger than a target amount (that is, larger than the target collection amount). In addition, since sample inflow to the sample collection nozzle 10 occurs not only in a stand by period (S3) but also in a moving period of the mixing agent discharge nozzle 10 in step (S2) and step (S5), the collection amount of the sample cannot be set to be smaller than a sample inflow amount during the moving period.

Therefore, according to the present embodiment, the pistons (13, 14) are provided inside the nozzles (2, 10) to seal the ports of the nozzles, so it is possible to prevent the concentration diffusion and the sample inflow during the moving period of the mixing agent discharge nozzle 2 and it is possible to improve the accuracy of sample collection.

In the present embodiment, an example has been described in which the liquid feeding pump 4 is turned on (S26) and then the liquid feeding pump 6 is turned on to supply the mixing agent to the mixing tank 8 (S27), but the control device may start the supply of the mixing agent from any timing (S21 to S25) after the start of the mixing flow.

In the present embodiment, an example has been described in which the mixing agent discharge nozzle 2 and the sample collection nozzle 10 are connected after the sample collection, but a spacing may be provided between the nozzles as long as the collection amount of the sample is not affected.

In addition, the sample collection nozzle 10 may be moved by the actuator. In this case, the actuator constitutes a movable mechanism that moves the sample collection nozzle 10 and adjusts the gap between the sample collection port and the mixing agent discharge nozzle. Further, in this case, the control device can cause the actuator to operate in accordance with a program for causing the actuator to operate.

As in the case of the first embodiment described above, when the nozzles (2, 10) are connected in step (S24), the valve 7 may shut off the flow of the sample to the mixing tank 8 side.

As in the case of the first embodiment described above, as long as the mixing system can be appropriately operated, a user or the like may perform operation in place of controlling by the control device to appropriately operate the mixing system. In this case, a component to be operated by the user or the like has a configuration that can be operated by the user or the like.

Next, a third embodiment will be described with reference to drawings. In the present embodiment, an example will be described in which the number of components is reduced and the accuracy of sample collection is further improved as compared with the mixing system described in the second embodiment described above. The same reference numerals may be used in common among different drawings for the same parts as those in the above embodiment or parts having similar functions as those in the above embodiment, and duplicate description may be omitted.

Figure 5:
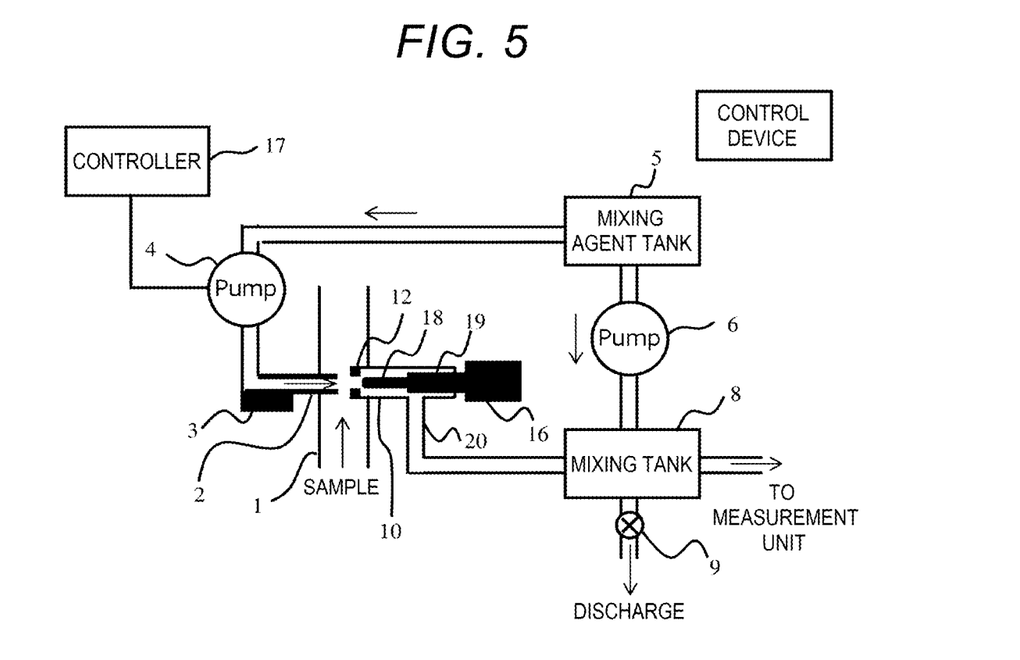
FIG. 5 is a schematic diagram showing a configuration of a mixing system according to a third embodiment of the invention.

FIG. 5 is a schematic diagram showing a configuration of a mixing system according to the present embodiment. As shown in FIG. 5, the mixing system includes the sample tube 1, the mixing agent discharge nozzle 2, the actuators (3, 16), the liquid feeding pumps (4, 6), the mixing agent tank 5, the valve 9, the mixing tank 8, the sample collection nozzle 10, a piston 18, and a controller 17.

In the present embodiment, the arrangement of the sample tube 1, the mixing agent discharge nozzle 2, the liquid feeding pumps (4, 6), the mixing agent tank 5, the mixing tank 8, and the sample collection nozzle 10 is the same as that of the second embodiment. However, the seal unit 11 and the piston 13 provided in the mixing agent discharge nozzle 2 are eliminated, and the actuator 15 is further eliminated. In addition, a structure of the piston 14 provided in the sample collection nozzle 10 is changed.

The controller 17 is a controller that controls a flow rate of the liquid feeding pump 4. The controller 17 may include a CPU, a ROM, etc. The ROM stores a program for causing the liquid feeding pump 4 to appropriately operate, and the controller 17 can control the flow rate of the liquid feeding pump 4.

The piston 18 has a stepped shape in which an outer diameter of a base end side is set to be larger than an outer diameter of a tip end side, and a large-diameter portion 19 is formed at the base end side of the piston 18. An outer diameter of the large-diameter portion 19 is set to be smaller than the inner diameter of the sample collection nozzle 10, and is preferably as close as possible to the inner diameter of the sample collection nozzle 10.

In the present embodiment, the mixing agent in the sample collection nozzle 10 is discharged by the large-diameter portion 19 by moving the piston 18 in a closing direction (left side in the drawing). Therefore, the large-diameter portion 19 of the piston 18 constitutes a backflow mechanism that causes the mixing agent or the mixing agent containing the sample to flow back from the sample collection port to the sample tube 1.

A tube 20 is connected to the sample collection nozzle 10 and the mixing tank 8. A connection position of the tube 20 with the sample collection nozzle 10 overlaps with the large-diameter portion 19 in a state where the piston 18 is fully closed (moved to the left side in the drawing) and does not overlap with the large-diameter portion 19 in a state where the piston 18 is fully opened (moved to a right side in the drawing).

Components such as the actuator 3 that moves the nozzle, the controller 17, the valve 9 operate based on an input electric signal. Further, the mixing system may be a system including a control device that causes the components to operate. In this case, the control device includes an arithmetic processing unit and a storage device (ROM), and the storage device stores a program necessary for causing the components to appropriately operate.

Figure 6:
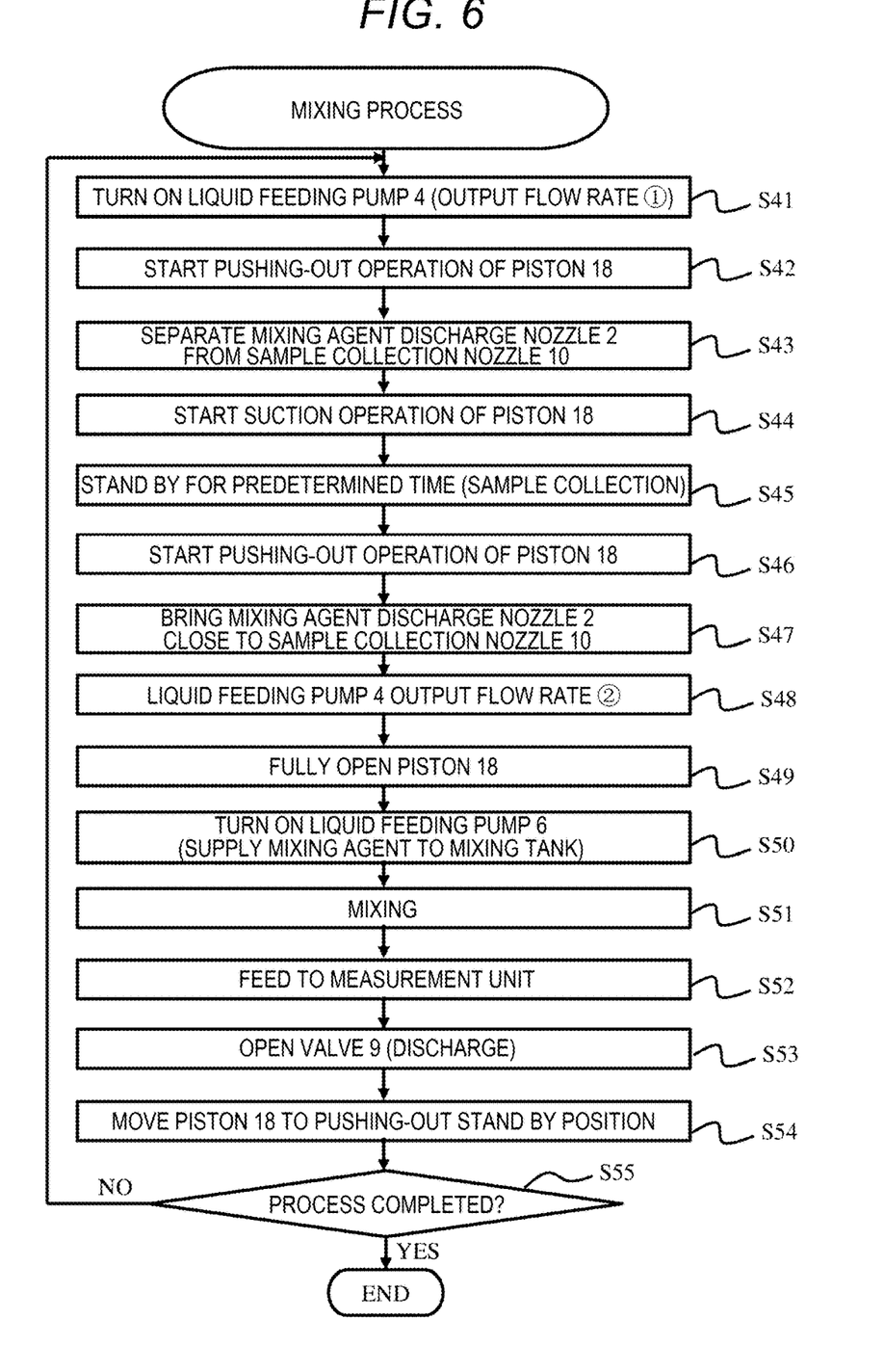
FIG. 6 is a mixing flowchart according to the third embodiment of the invention.

Next, an example of a mixing flow according to the present embodiment will be described with reference to FIG. 6.

First, the control device turns on the liquid feeding pump 4 (S41), starts a pushing-out operation of the piston 18 (S42), and then separates the mixing agent discharge nozzle 2 from the sample collection nozzle 10 (S43). At this time, the flow rate of the liquid feeding pump 4 is a flow rate adjusted in advance so that the concentration diffusion of the sample into the mixing agent discharge nozzle 2 does not occur. Therefore, the sample inflow to the mixing agent discharge nozzle 2 is prevented. The flow rate of the liquid feeding pump 4 at this time is set by the controller 17. The control device causes the piston 18 to move in the closing direction (left side in the drawing) at a predetermined speed. At this time, the mixing agent in the sample collection nozzle 10 is discharged from a nozzle inlet by the large-diameter portion 19. A discharge flow rate at this time is a flow rate adjusted in advance, and the discharge flow rate is adjusted so as to be capable of preventing the concentration diffusion of the sample into the nozzle 2. The discharge flow rate is adjusted by setting a moving speed of the piston 18.

Next, the control device causes the piston 18 to move in an opening direction (right side in the drawing) (S44). The required amount of the sample is collected by standing by for a predetermined time (S45). Thereafter, the control device starts the pushing-out operation of the piston 18 in the same manner as step (S42) (S46), and brings the mixing agent discharge nozzle 2 close to the sample collection nozzle 10 to connect the ports while preventing the sample from entering the sample collection nozzle 10 (S47).

Thereafter, the control device changes an output flow rate of the liquid feeding pump 4 (S48), fully opens the piston 18 (S49), and causes the sample in the sample collection nozzle 10 to be pushed out. Furthermore, the control device turns on the liquid feeding pump 6 to supply the mixing agent to the mixing tank 8 so as to adjust the sample concentration in the mixing tank 8 to the predetermined value (S50). Next, the control device controls the stirring device to perform mixing so that the concentration in the mixing tank becomes uniform (S51), and the mixed liquid is sent to the measurement unit (S52).

The control device opens the valve 9 to discharge the unwanted mixed liquid (S53). The control device causes the piston 18 to move to a pushing-out stand by position to return the piston to the initial state (S54). When the change of the sample in the sample tube 1 is to be measured in real time, the control device repeats S41 to S54 (S55).

Since the mixing system of the second embodiment has a structure in which the sample in spaces surrounded by tip end surfaces of the pistons (13, 14) and insides of the seal units (11, 12) is taken in in step (S26) even when the pistons (13, 14) are closed, the collection amount of the sample cannot be set to be lower than an amount in the spaces.

However, in the present embodiment, the large-diameter portion 19 of the piston 18 as the backflow mechanism pushes out the mixing agent (that is, in the example described above, the piston 18 performs the pushing-out operation in step S42 and step S46), so that the mixing system can form a flow from the mixing agent discharge nozzle 2 and the sample collection nozzle 10 to a sample tube side, and therefore can make an unnecessary collection amount of the sample close to zero. As a result, it is possible to achieve an accuracy of sample collection of the order of μL depending on a material.

The moving speed of the piston 18 that pushes out the mixing agent (in other words, the discharge flow rate of the mixing agent from the sample collection nozzle 10) can be set by an appropriate method. For example, the control device may acquire data on flow rate control by the controller 17 to set the moving speed of the piston 18. In addition, a sensor that measures the flow rate may be provided as appropriate, and the control device may set the moving speed of the piston 18 by using data acquired by the sensor.

As in the case of the embodiment described above, as long as the mixing system can be appropriately operated, a user or the like may perform operation in place of controlling by the control device to appropriately operate the mixing system. In this case, a component to be operated by the user or the like has a configuration that can be operated by the user or the like.

Next, a fourth embodiment will be described with reference to a drawing. In the present embodiment, an example of a measurement system in which the mixing agent is recycled so that a separate mixing agent utility is not required will be described using the mixing system described in the third embodiment. The same reference numerals may be used in common among different drawings for the same parts as those in the above embodiment or parts having similar functions as those in the above embodiment, and duplicate description may be omitted.

Figure 7:
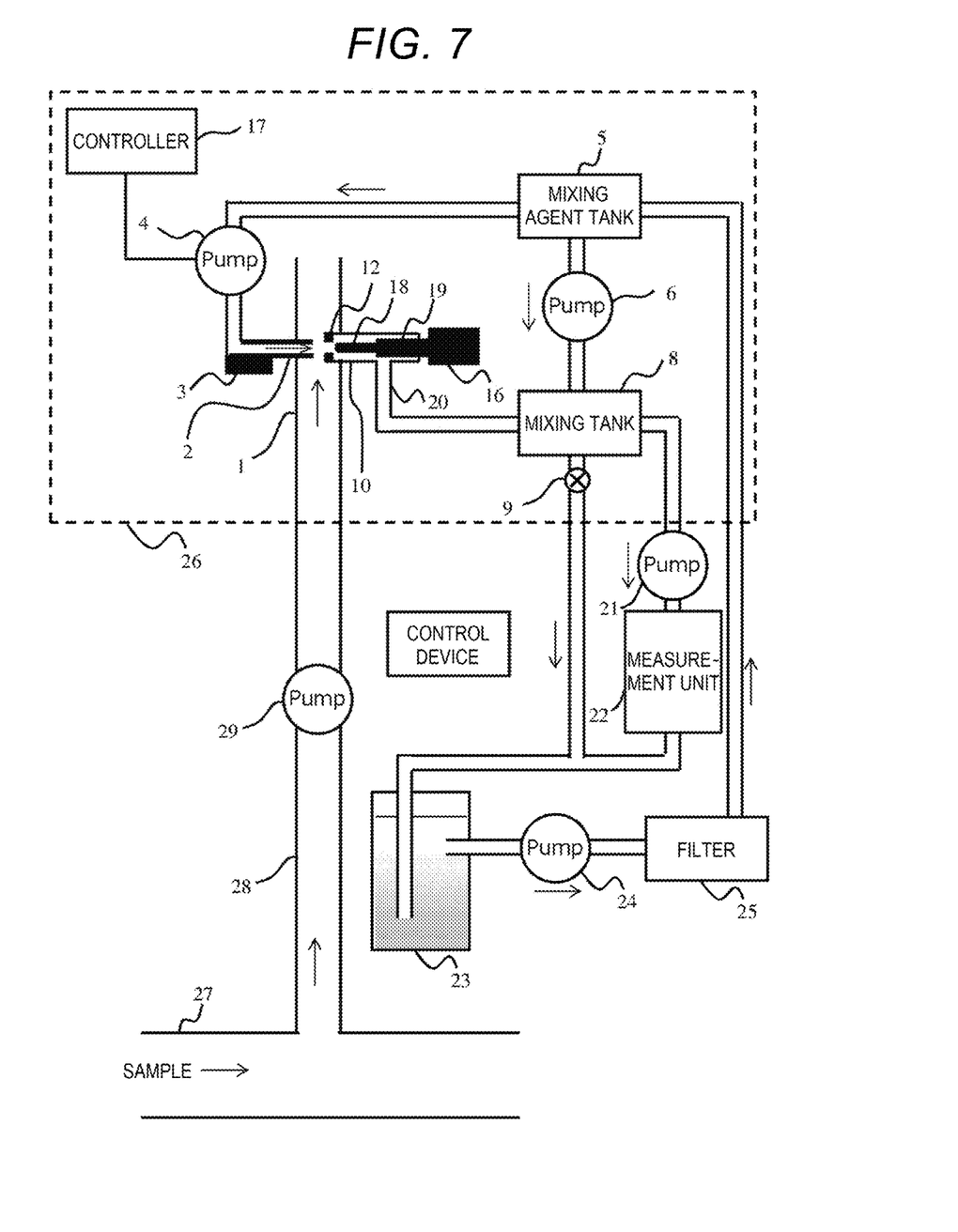
FIG. 7 is a schematic diagram showing a configuration of a measurement system according to a fourth embodiment of the invention.

FIG. 7 is a schematic diagram showing a configuration of the measurement system according to the present embodiment. As shown in FIG. 7, the measurement system includes a mixing system 26, liquid feeding pumps (21, 24, 29), a measurement unit 22, a buffer tank 23, a filter 25, and a sample extraction tube 28. The liquid feeding pumps (21, 24, 29) are configured to operate based on signals to be input. A mechanical configuration of the mixing system 26 is the same as the configuration described in the third embodiment. In the present embodiment, the control device can also control operation of the liquid feeding pumps (21, 24, 29) in addition to the configuration in the case of the mixing system.

In the measurement system of the present embodiment, the extraction tube 28 is provided in a tube 27 of a production line through which the sample flows, the sample is sucked out by the liquid feeding pump 29, and the sample is introduced into the sample tube 1 in the mixing system 26.

The liquid feeding pump 21 feeds the mixed liquid of the mixing agent and the sample in the mixing tank 8 to the measurement unit 22.

In the measurement unit 22, a state of the sample contained in the mixed liquid is measured. Measurement contents are, for example, analysis of components contained in the sample, measurement of a particle size distribution of particles contained in the sample, analysis of a shape of the particles by a camera or the like, etc. When measurement equipment such as the camera is used in the measurement unit 22, the measurement equipment may be controlled by a control device provided in the measurement equipment, or the control device of the measurement system may be capable of controlling operation of the measurement equipment.

The mixed liquid passing through the measurement unit 22 and the mixed liquid discharged from the mixing tank 8 are stored in the buffer tank 23. Then, in the present embodiment, rough separation (so-called sedimentation separation) when a specific gravity of the sample is larger than a specific gravity of the mixing agent is performed in the buffer tank 23. That is, in the rough separation, the sample is sedimented at the bottom of the buffer tank 23 over time, so that a supernatant separated from the sample is sucked out by the liquid feeding pump 24. Although the sedimentation separation using a specific gravity difference between the sample and the mixing agent has been described here, the rough separation may be performed by another well-known method (for example, centrifugal separation). A method for rough separation can be appropriately determined based on well-known methods according to the sample to be roughly separated (for example, in consideration of the size of the particles, the shape of the particles, an aggregation property of the particles, and the like).

The supernatant sucked out from the buffer tank 23 by the liquid feeding pump 24 is filtered by the filter 25 to remove a remaining solid content. Then, the liquid passing through the filter 25 is returned to the mixing agent tank 5 and recycled as a mixing agent. For example, when it is considered that an amount of the solid content contained in the mixed liquid passing through the measurement unit 22 is small in consideration of a concentration or the like of the sample to be measured, the rough separation of the mixed liquid passing through the measurement unit 22 in the buffer tank 23 may be omitted, and the mixed liquid may be directly filtered by the filter 25.

The measurement system described in the present embodiment includes the measurement unit 22 that measures the sample collected by the mixing system, and the filter 25 that separates the solid content. After the sample mixed in the mixing system passes through the measurement unit 22, the solid content is separated in the filter 25 and a component passing through the filter 25 is recycled as a mixing agent.

Since the measurement system allows the mixing agent to be recycled within the system, no additional utilities that supply the mixing agent are required. However, since the sample is accumulated in devices that separate the solid content (the buffer tank 23 and the filter 25 in the present embodiment) as processing is repeated, it is necessary to, for example, remove the sample and replace the filter 25 every predetermined number of times of processing.

However, the measurement system can reduce a minimum collection amount of the sample per processing to the order of μL by using the mixing system shown in the third embodiment. As a result, an amount of the sample accumulated in the devices that separate the solid content (the buffer tank 23 and the filter 25 in the present embodiment) can be significantly reduced, and a frequency of sample removal and filter replacement can be significantly reduced.

In addition, when the sample containing the particles is to be measured more accurately, it may be necessary to add a dispersant such as a surfactant to prevent aggregation, but the mixing agent to which the dispersant is added can be recycled in the present embodiment, and therefore a use amount of the expensive dispersant can be significantly reduced.

Although an example in which the mixing system described in the third embodiment is used as the mixing system has been described in the present embodiment, the mixing system described in the first embodiment or the second embodiment may also be used.

In addition, a configuration for recycling the mixing agent may be omitted, and the measurement system may be a system including the mixing system described above and the measurement unit. As a result, it is possible to provide the measurement system using the compact mixing system capable of reducing the use amount of the mixing agent and reducing the volume of the utility that supplies the mixing agent.

When the measurement system can be appropriately operated, the user or the like may perform an operation in place of controlling by the control device to appropriately operate the measurement system. In this case, a component to be operated by the user or the like is a component that can be operated by the user or the like.

What is claimed is:

1. A mixing system, comprising:
   a movable mechanism that adjusts a gap between a mixing agent discharge nozzle that discharges a mixing agent to be mixed with a sample, and a sample collection port that is open to an inside of a sample pipe through which the sample flows and that collects the sample;
   a shut off mechanism that is configured to shut off a flow of the sample flowing in from the sample collection port; and
   a control device configured to control an operation of the shut off mechanism, wherein
   the control device controls the shut off mechanism so as to shut off flow of the sample when the gap between the sample collection port and the mixing agent discharge nozzle is narrowed,
   a discharge port of the mixing agent discharge nozzle is disposed adjacent to the sample collection port,
   the gap is an interval between the mixing agent discharge nozzle and the sample collection port, and
   the shut off mechanism is a valve.

2. The mixing system according to claim 1, further comprising: a sealing mechanism configured to prevent the sample from flowing into at least one of the mixing agent discharge nozzle and the sample collection port.

3. The mixing system according to claim 1, wherein when the sample is collected, the mixing agent is discharged from the mixing agent discharge nozzle in order to prevent the sample from flowing into the mixing agent discharge nozzle.

4. The mixing system according to claim 1, further comprising: a backflow mechanism configured to cause a mixed agent or a mixed agent containing a sample to flow back from the sample collection port to the sample pipe.

5. The mixing system according to claim 1, wherein an orientation of the sampling port is 90° or more with respect to the flow direction of the sample, and there is no obstacle overlapping the sampling port when viewed from an upstream direction of the flow of the sample.

6. The mixing system according to claim 1, further comprising: a control device that is configured to control an operation of the movable mechanism, wherein the control device is configured to control the gap such that the gap between the sample collection port and the mixture discharge nozzle is widened when a sample is collected, and the movable mechanism is controlled such that the gap between the sample collection port and the mixture discharge nozzle is narrowed when the collection of the sample is finished.

7. The mixing system according to claim 5, further comprising: a control device that is configured to control an operation of the backflow mechanism, wherein the control device causes the mixing agent or the mixing agent containing the sample to flow back from the sample collection port to the sample pipe, when the gap between the sample collection port and the mixing agent discharge nozzle is adjusted.

8. A measurement system comprising:
   the mixing system according to claim 1; and
   a measurement unit configured to measure a sample collected by the mixing system.

9. The measurement system according to claim 8, further comprising: a filter that separates a solid content, wherein
   after the sample mixed in the mixing system passes through the measurement unit, the solid content is separated in the filter, and
   a component that has passed through the filter is reused as the mixing agent.

10. The measurement system according to claim 9, further comprising: a control device that is configured to control an operation of the movable mechanism, wherein
   the mixing system comprises a backflow mechanism that is configured to cause a mixed agent or a mixed agent containing a sample to flow back from the sample collection port to the sample pipe, the control device is configured to control an operation of the backflow mechanism, and when the gap between the sample collection port and the mixture discharge nozzle is adjusted, the control device causes the mixture or the mixture containing the sample to flow back from the sample collection port to the sample pipe.

* * * * *